United States Patent
Kremer et al.

(10) Patent No.: US 11,873,784 B2
(45) Date of Patent: Jan. 16, 2024

(54) GAS METERING VALVE FOR INTERNAL COMBUSTION ENGINES

(71) Applicant: Robert Bosch GmbH, Stuttgart (DE)

(72) Inventors: Andreas Kremer, Waiblingen (DE); Andreas Koeninger, Neulingen-Goebrichen (DE); Daniel Bosse, Markgroeningen (DE); Fabian Fischer, Waiblingen (DE); Gerhard Suenderhauf, Tiefenbronn (DE); Lars Olems, Stuttgart (DE); Marco Beier, Rudolstadt (DE); Matthias Horn, Freiberg (DE); Oezguer Tuerker, Gerlingen (DE); Sebastian Laechele, Backnang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/794,372

(22) PCT Filed: Jan. 27, 2021

(86) PCT No.: PCT/EP2021/051857
§ 371 (c)(1),
(2) Date: Jul. 21, 2022

(87) PCT Pub. No.: WO2021/151941
PCT Pub. Date: Aug. 5, 2021

(65) Prior Publication Data
US 2023/0053845 A1    Feb. 23, 2023

(30) Foreign Application Priority Data

Jan. 31, 2020  (DE) ...................... 10 2020 201 168.0
Feb. 18, 2020  (DE) ...................... 10 2020 201 973.8

(51) Int. Cl.
*F02M 21/02*    (2006.01)

(52) U.S. Cl.
CPC .... *F02M 21/0242* (2013.01); *F02M 21/0263* (2013.01); *F02M 21/0293* (2013.01)

(58) Field of Classification Search
CPC ........... F02M 21/0263; F02M 21/0293; F02M 21/0257; F02M 21/026; F02M 21/0269;
(Continued)

(56) References Cited

U.S. PATENT DOCUMENTS

| 2006/0186230 A1 | 8/2006 | Adams |
| 2007/0175519 A1 | 8/2007 | Moriya |
| 2014/0231693 A1 * | 8/2014 | Terashima ................ F16K 1/36 |
| | | 251/333 |

FOREIGN PATENT DOCUMENTS

| CA | 2847547 A1 * | 3/2013 | ......... F02M 21/0254 |
| DE | 102009012688 B3 * | 7/2010 | ......... F02M 21/0254 |

(Continued)

OTHER PUBLICATIONS

International Search Report for PCT/EP2021/051857, dated Apr. 30, 2021.

*Primary Examiner* — Hung Q Nguyen
(74) *Attorney, Agent, or Firm* — Norton Rose Fulbright US LLP

(57) ABSTRACT

A gas metering valve for an internal combustion engine. The gas metering valve includes a housing in which a gas chamber is formed, which includes an inlet opening and an outlet opening. A movable valve element is situated in the gas chamber, which is movable by an electrical actuator against the force of a return spring and which cooperates with a valve seat for opening and closing the inlet opening. A blocking valve is situated between the valve element and the outlet opening, which opens in the flow direction to the outlet opening and blocks in the opposite flow direction.

14 Claims, 7 Drawing Sheets

(58) Field of Classification Search
CPC ........... F02M 21/0272; F02M 21/0275; F02M 21/023; Y02T 10/30
See application file for complete search history.

(56) References Cited

FOREIGN PATENT DOCUMENTS

| | | | |
|---|---|---|---|
| DE | 102013202599 A1 * | 8/2014 | ......... F02M 21/0266 |
| DE | 102013202631 A1 * | 8/2014 | ......... F02M 21/0266 |
| DE | 102013222030 A1 | 4/2015 | |
| DE | 102014212562 A1 * | 4/2015 | ......... F02M 21/0254 |
| DE | 102014200756 A1 | 7/2015 | |
| DE | 102014224340 A1 | 6/2016 | |
| DE | 102014224341 A1 | 6/2016 | |
| DE | 102016215027 A1 | 2/2018 | |
| DE | 102018206334 A1 | 10/2019 | |
| JP | 2002227742 A | 8/2002 | |
| JP | 2013227960 A | 11/2013 | |
| WO | WO-2014154451 A1 * | 10/2014 | ......... F02M 21/0254 |
| WO | WO-2019072793 A1 * | 4/2019 | ........... B05B 1/3053 |
| WO | WO-2020105571 A1 * | 5/2020 | |

* cited by examiner

GAS METERING VALVE FOR INTERNAL COMBUSTION ENGINES

FIELD

The present invention relates to a gas metering valve, as is preferably used to directly meter gaseous fuel into a combustion chamber of an internal combustion engine.

BACKGROUND INFORMATION

Gas valves for the metered addition of gases are described in the related art. For example, German Patent Application No. DE 10 2016 215 027 A1 shows a gas valve which is part of a recirculation device of a fuel cell system. The gas valve includes a movable valve element, which is movable against the force of a spring element by a solenoid within the gas valve, thereby opening and closing an inlet opening. The gas flow is conducted through boreholes within the valve element and in this way reaches an outlet opening, the valve element being guided within the gas valve on its outer side. By switching the solenoid on and off, the gas to be metered may be supplied to the fuel cell at the desired point in time and in the required amount. Excess thermal loading of the seal seat at the valve element is not to be expected with this use.

The requirements, however, are different when metering gases directly into a combustion chamber of an internal combustion engine. Due to combustion, high temperatures and pressures occur in the combustion chamber, which may result in extensive heating of the gas metering valve since it opens directly into the combustion chamber. If, for example, hydrogen is to be metered in, good sealing by a metallic seal seat may only be achieved with difficulty, above all since reliable sealing over the entire service life of the metering valve is indispensable for safety reasons. For this reason, the use of an elastomer seal is necessary, which, however, may only be exposed to relatively low temperatures without being damaged. To limit the temperatures, the seat of the gas metering valve may be situated relatively far from the outlet opening, and thus from the combustion chamber. This, however, causes a higher susceptibility of the gas metering valve with respect to a flashback of the flames in the combustion chamber into the gas metering valve since, due to the seal seat situated further away from the combustion chamber, a relatively large volume of the gas metering valve is directly connected to the combustion chamber. In particular, when residues of the combustible gas are situated in the gas metering valve, the flame front of the combustion chamber may propagate into the gas metering valve, and cause extensive thermal loading there, in particular, at the seal seat.

SUMMARY

A gas metering valve according to the present invention may have an advantage that the thermal load of the seal seat is reduced, and reliable sealing of the gas to be metered between the individual injections, and with the internal combustion engine switched off, is ensured. For this purpose, in accordance with an example embodiment of the present invention, the gas metering valve includes a housing in which a gas chamber is formed, which includes an inlet opening and an outlet opening. A movable valve element is situated in the gas chamber, which is movable by an electrical actuator against the force of a return spring and which cooperates with a seal seat for opening and closing the inlet opening. A blocking valve is situated between the valve element and the outlet opening, which is able to additionally interrupt the gas flow to the outlet opening.

If gas is to be metered into the combustion chamber, the valve element is opened by the electrical actuator, for example a solenoid. The gas flowing in through the inlet opening results in a pressure increase upstream from the blocking valve, which opens the blocking valve. The gas passes the blocking valve and ultimately reaches the combustion chamber. Even during or shortly after completion of the gas injection, and thus the closing of the valve element, the combustion in the combustion chamber is ignited, the flame front also propagating in the direction of the gas metering valve. However, since the blocking valve also closes immediately after the inlet opening of the gas metering valve has closed, the flame front in the combustion chamber is only able to propagate up to the blocking valve, and the seal seat of the valve element is effectively protected. In addition, the suddenly rising pressure in the combustion chamber as a result of the combustion supports the closing of the blocking valve. Since the valve seat is protected against high temperatures, an elastic seal, for example an elastomer seal, may be used there, which is, in particular, advantageous in the case of hydrogen.

In a first advantageous embodiment of the present invention, the blocking valve includes a movable closing element, which is loaded by a closing spring and is preferably guided in the gas chamber in a longitudinally movable manner. In this way, a blocking valve without further, in particular, without electrical, elements is created, which effectively only allows the gas flow in the desired flow direction, and thus functions as a check valve. In the process, the closing element may be designed in a plate-shaped manner, which, on the one hand, is a shape that is easy to manufacture and, on the other hand, opens a large flow cross-section during a longitudinal movement perpendicular to the plane of the plate, even with little lift. In this way, the inevitable restriction at the blocking valve may be kept low, so that the full gas pressure is available for the injection of the gaseous fuel. In an advantageous manner, it may also be provided that the return spring, which acts on the valve element in the closing direction, is supported with its other end at the closing element.

In one further advantageous embodiment of the present invention, a pressure pin is formed at the valve element, which ends up resting against the closing element during an opening movement of the valve element, and thus exerts an opening force onto the closing element, i.e., opens the blocking valve. In this embodiment, the blocking valve is not only opened by the pressure difference upstream and downstream from the closing element, but already by the movement of the valve element. This shortens the response time of the gas metering valve, i.e., the time which elapses between the electrical actuator being activated and the gaseous fuel actually flowing out.

In the further advantageous embodiment of the present invention, the valve element cooperates with a valve seat in the gas chamber for closing the inlet opening. In the process, an elastic sealing element is advantageously situated at the valve seal surface of the valve element or at the valve seat. The inlet opening may be closed very tightly by the elastic sealing element, which is, in particular, important when metering gaseous hydrogen, so that no undesirable leakage occurs at the valve seat. In the case of hydrogen, it is essential for safety reasons that the valve seat is completely tight when the engine is shut off. Hydrogen, which could ignite, must not accumulate outside the engine, even over an extended service life of the engine, which is installed in a commercial vehicle, for example.

To further enhance the tightness, a biting edge may furthermore advantageously be provided at the valve seat. It increases the contact pressure in this area, which further enhances sealing. In addition, a circumferential annular ridge may be provided at the valve element. It may surround the biting edge, and its height is dimensioned in such a way that first the elastic sealing element ends up resting against the valve seat, and thereafter the annular ridge, during the closing movement of the valve element. In this way, a minimum distance between the valve seal surface and the valve seat is defined by the annular ridge, in order to not excessively load the elastic sealing element.

In one further advantageous embodiment of the present invention, the blocking valve includes a valve needle, which serves as a closing element here. It is situated in the gas chamber in a longitudinally movable manner and prevents gas from flowing back into the gas chamber. Advantageously, a valve seat, with the aid of which the valve needle cooperates with a corresponding seal surface, is formed at the end of the valve needle facing the outlet opening. In the process, the valve needle is preferably preloaded in the direction of this seal surface by a closing spring.

In one further advantageous embodiment of the present invention, a pressure pin is formed at the valve element, which ends up resting against the valve needle during the opening movement of the valve element, and thereby exerts an opening force thereon. Similarly to the exemplary embodiment including a disk-shaped closing element, the blocking valve is opened together with the valve element.

BRIEF DESCRIPTION OF THE DRAWINGS

The drawings show various exemplary embodiments of the present invention.

DETAILED DESCRIPTION OF EXAMPLE EMBODIMENTS

Figure 1:
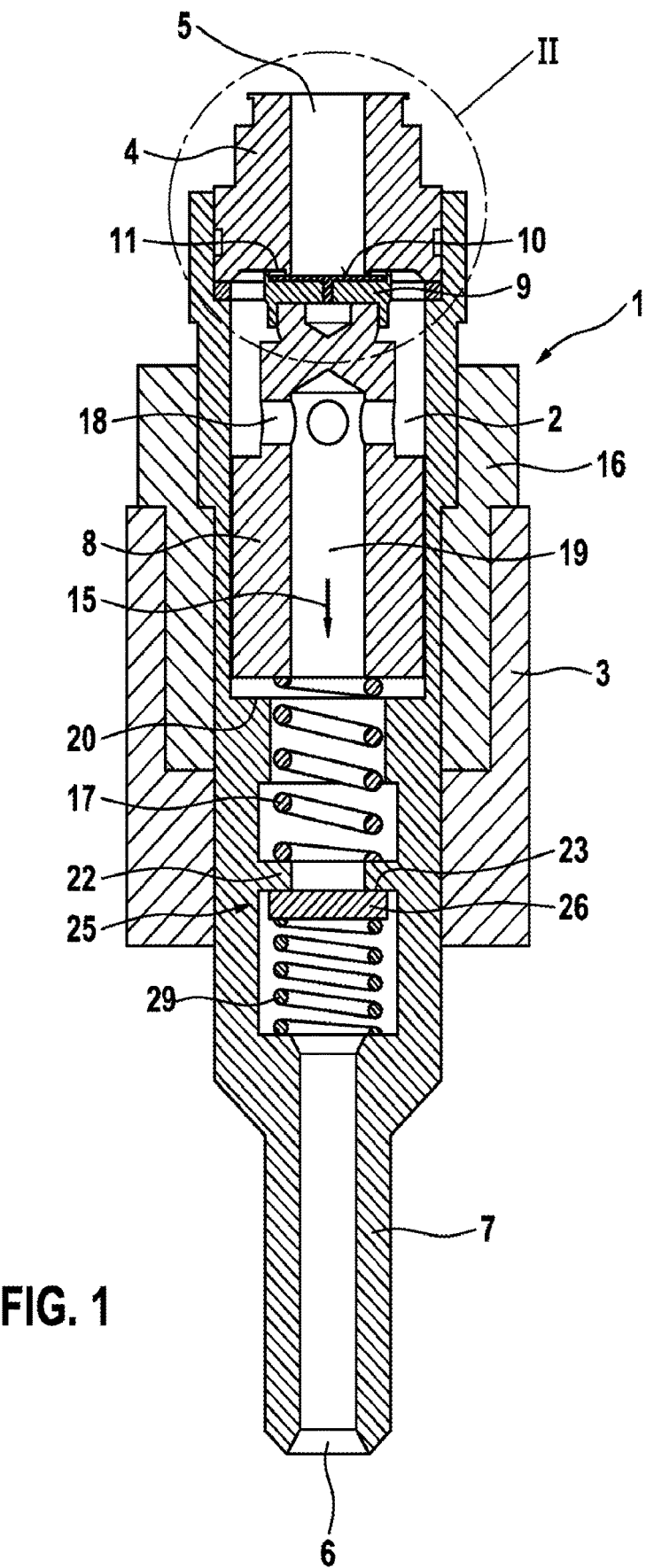
FIG. 1 shows a longitudinal section through a first exemplary embodiment of a gas metering valve according to the present invention.

FIG. 1 shows a first exemplary embodiment of a gas metering valve according to the present invention in a longitudinal section. The gas metering valve includes a housing 1 in which a gas chamber 2 is formed. Gas chamber 2 includes an inlet opening 5 and an outlet opening 6, the gas to be metered reaching the gas metering valve via inlet opening 5, and reaching a combustion chamber of an internal combustion engine via outlet opening 6. Outlet opening 6 is formed at the end of a nozzle shaft 7, which guides the gas flow so that the gas reaches the desired spatial area of the combustion chamber. A valve element 8, which at its end face facing inlet opening 5 includes a valve seal surface 10 designed as a sealing element 9 which is part of valve element 8, is situated in a longitudinally movable manner in gas chamber 2. With the aid of valve seal surface 10, valve element 8 cooperates with a valve seat 11 for closing inlet opening 5, valve seat 11 in this exemplary embodiment being formed in a connection 4 which is part of housing 1 and includes a longitudinal borehole, which forms inlet opening 5.

Figure 2:
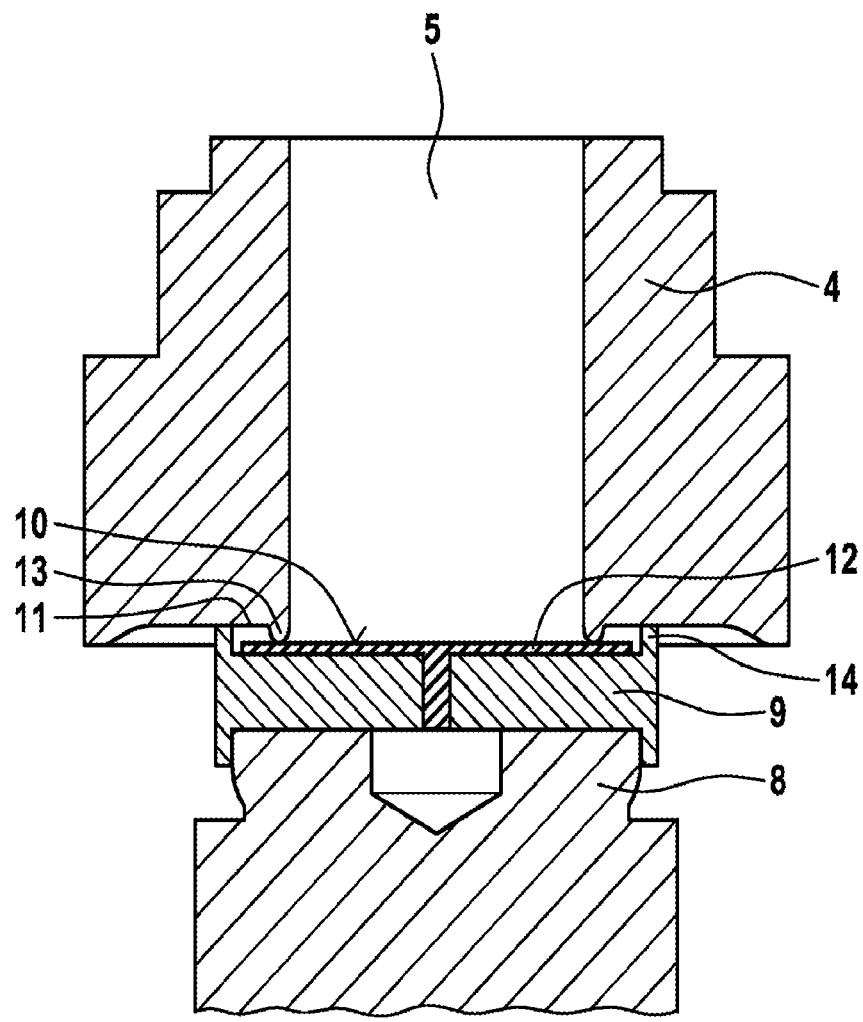
FIG. 2 shows the section denoted by II in FIG. 1 in an enlarged illustration.

To achieve reliable sealing of inlet opening 5, an elastic seal 12 is situated at valve seal surface 10 of valve element 8, as is shown in FIG. 2 in an enlarged representation of the section of FIG. 1 denoted by II. Elastic seal 12, for example an elastomer, covers valve seal surface 10 in the process, and cooperates with a biting edge 13 formed at valve seat 11 and surrounding inlet opening 5. As a result of biting edge 13, the contact pressure between valve seat 11 and elastic seal 12 is increased, so that gas-tight sealing is achieved, even when metering highly volatile gases, such as, for example, hydrogen. Furthermore, an annular ridge 14 is formed at the outer edge of sealing element 9 at valve seal surface 10, annular ridge 14 surrounding the biting edge and its height being dimensioned in such a way that initially elastic seal 12 rests against biting edge 13 during the closing movement of valve element 8 in the direction of valve seat 11, and only thereafter, with the further closing movement, also annular ridge 14 rests against valve seat 11. In the process, the height of annular ridge 14 is greater than the height of biting edge 13, so that, even though elastic seal 12 is pressed against biting edge 13 and thereby provides effective sealing, it is not excessively mechanically loaded.

To move valve element 8 in the gas metering valve, an electrical actuator in the form of a solenoid 16 is present, which surrounds housing 1 at the height of valve element 8 and is fixed by a clamping nut 3. In the process, valve element 8 acts as a plunger of solenoid 16, so that valve element 8 is pulled away from valve seat 11 when solenoid 16 is energized until valve element 8 ends up resting against a lift stop 20 in gas chamber 2. The movement of valve element 8 takes place against the force of a return spring 17, which preloads valve element 8 against valve seat 11 and which also ensures that valve element 8 returns to its closed position and closes inlet opening 5, with solenoid 16 being switched off. To conduct the gas flow out of inlet opening 5 to outlet opening 6, a cross borehole 18 and a longitudinal borehole 19 intersecting the same are formed in valve element 8, which are dimensioned in such a way that no noteworthy restriction of the gas flow occurs in this area.

A blocking valve 25 is situated between valve element 8 and outlet opening 6. In this exemplary embodiment, only a gas flow in flow direction 15 from inlet opening 5 to outlet opening 6 is allowed, but a gas flow in the opposite direction is blocked. Blocking valve 25 encompasses a closing element 26, here in the form of a flat disk. Closing element 26 is pushed by a closing spring 29 against a seal surface 23, which is formed at a projection 22 situated in gas chamber 2. Blocking valve 25 thus only opens when the gas pressure between closing element 26 and valve element 8 is greater than the gas pressure on the opposite side of closing element 26, and in the process is able to overcome the force of closing spring 29. Since closing element 26 has a disk-shaped design, it includes a circumferential edge, so that the closing element opens a relatively large flow cross-section even with little lift, and the gas is able to flow to outlet opening 6 without noteworthy restriction.

If gaseous fuel is to be metered into the combustion chamber, solenoid 16 is energized, and valve element 8 is pulled away from valve seat 11 by the action of the magnetic field thus generated until it rests against lift stop 20. The gas thereupon flows through inlet opening 5 and cross and longitudinal boreholes 18, 19 of valve element 8 to blocking valve 25. Due to the rising pressure on the side of closing element 26 which faces valve element 8, it is pushed open against the force of closing spring 29 and exposes a flow cross-section between seal surface 23 and the closing element, through which gas reaches nozzle shaft 7, and ultimately outlet opening 6. To end the gas injection, the energization of solenoid 16 is interrupted so that valve element 8 closes inlet opening 5 again. Since now gas no longer flows to blocking valve 25, it is also closed by closing spring 29.

The gas metering valve is, in particular, suitable for the injection of gas into a combustion chamber of an internal combustion engine since it enables reliable sealing of the gas, with a simultaneously high service life. Due to nozzle shaft 7, valve element 8, and thus elastic seal 12, is situated far away from the combustion chamber, which limits the thermal loading of valve seat 11. In addition, blocking valve 25 prevents the flame front in the combustion chamber from propagating into gas chamber 2 since blocking valve 25 closes immediately after the gas injection has ended, which is additionally supported by the rising pressure in the combustion chamber. In this way, excessive heating of valve seat 11 is reliably prevented.

Figure 3:
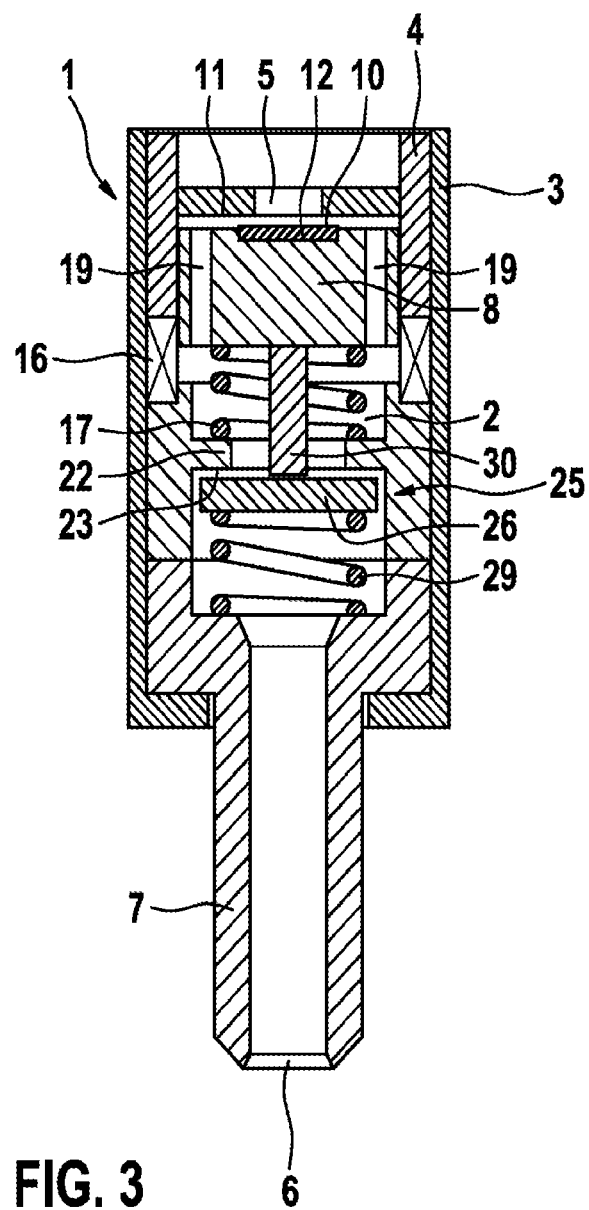
FIG. 3 shows another exemplary embodiment of the present invention, the gas metering valve only being schematically represented here.

FIG. 3 shows another exemplary embodiment of the gas metering valve according to the present invention in a longitudinal section, this representation only being schematically implemented. The most important design difference compared to the exemplary embodiment of FIG. 1 is a pressure pin 30, which is situated at valve element 8. During the opening movement of valve element 8, pressure pin 30 ends up resting against closing element 26 and moves it into its open position against the force of closing spring 29. Since blocking valve 25 thus opens practically simultaneously with valve element 8, no delay arises as a result of the otherwise necessary pressure build-up upstream from blocking valve 25, resulting in a shorter response time, i.e., a shorter delay between the energization of solenoid 16 and the start of the gas injection. The closing process of this gas metering valve takes place similarly to the exemplary embodiment of FIG. 1.

Figure 4A:
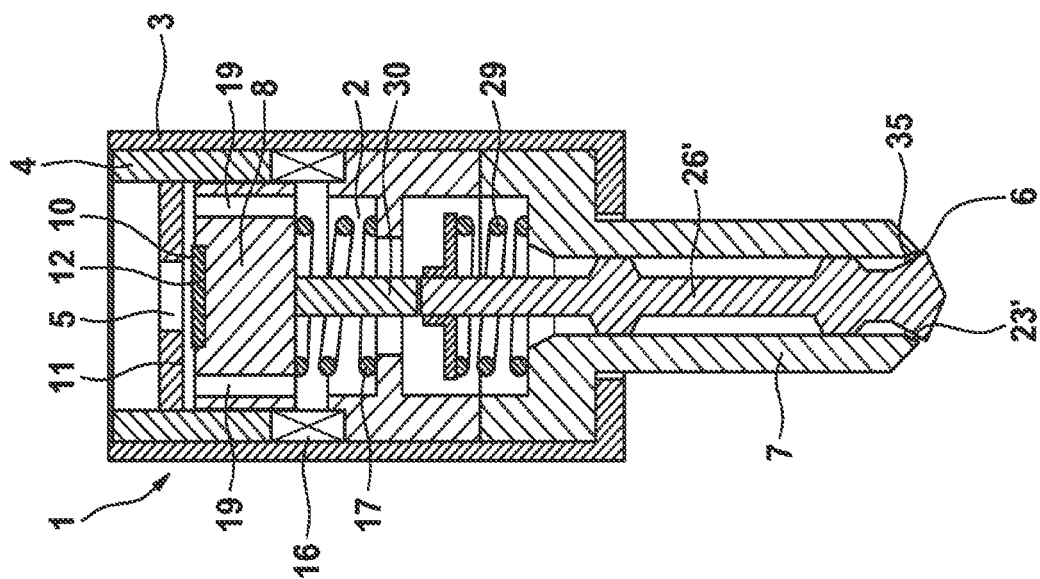
FIGS. 4A, 4B and 4C show further exemplary embodiments of gas metering valves according to the present invention, also in schematic illustrations, including a needle-shaped closing element.

FIG. 4A shows another exemplary embodiment of the gas metering valve according to the present invention, the representation corresponding to that of FIG. 3. For simplification, valve element 8 and valve seat surface 10 are only shown in simplified form, and two longitudinal boreholes 19 are formed here, instead of cross and longitudinal boreholes 18, 19, which, however, is functionally identical. Blocking valve 25 includes a closing element in the form of a valve needle 26' here. Valve needle 26' is guided in nozzle shaft 7 by a first guide section 32 and a second guide section 33, polished sections, which are not shown here, being formed at both guide sections 32, 33, which allow gas to flow past guide sections 32, 33 in an unrestricted manner. At its end facing outlet opening 6, valve needle 26' includes a valve seat 35, with the aid of which valve needle 26' cooperates with a conical seal surface 23' at the end of nozzle shaft 7. In the process, valve needle 26' is pushed by a closing spring 29 against seal surface 23' and, similarly to the closing element in the exemplary embodiment of FIG. 1, opens as a result of a corresponding pressure in gas chamber 2. The sealing with respect to the combustion chamber thus takes place directly at the end of the gas metering valve, so that the flame front of the combustion chamber is only able to still reach the outermost end of housing 1.

Figure 4B:
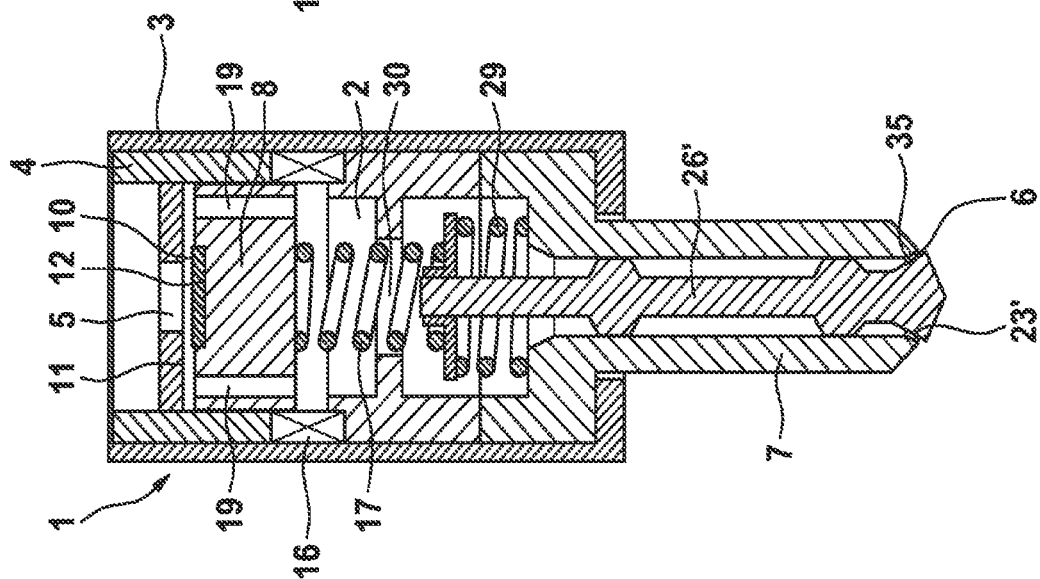

FIG. 4B shows a modification of this exemplary embodiment. Here, return spring 17 of valve element 8 is not supported at a projection of housing 1, but at the closing element or valve needle 23'. Since no supporting surface for return spring 17 has to be provided, larger design freedoms result in the design of housing 1.

Figure 4C:
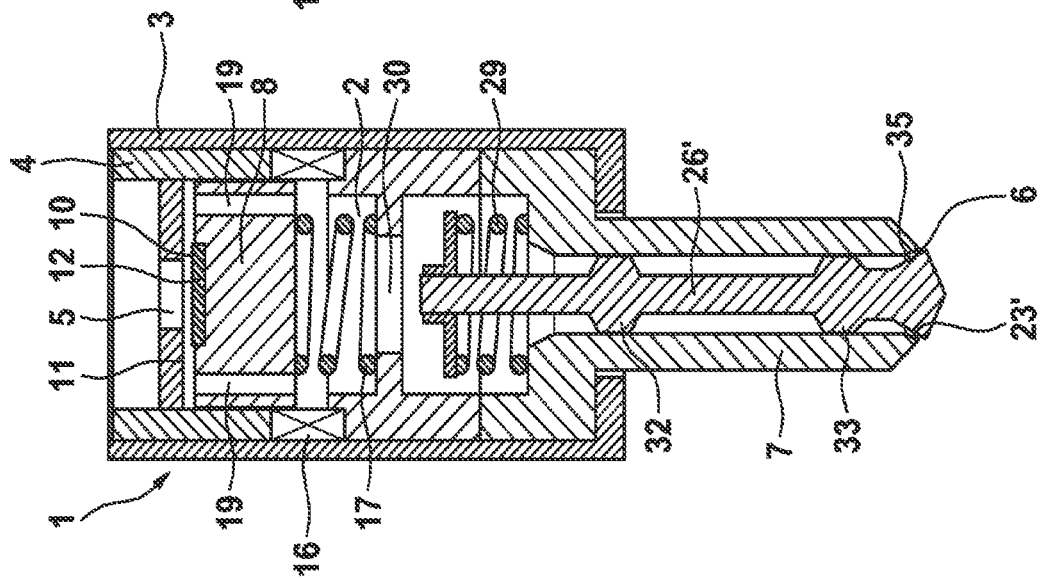

FIG. 4C shows another exemplary embodiment according to the present invention. Similarly to the exemplary embodiment according to FIG. 3, a pressure pin 30 is formed at valve element 8 here, which ends up resting against valve needle 26' during the opening movement of valve element 8 and moves it against the preload of closing spring 29. Functionally, this results in the same cooperation between valve element 8 and valve needle 26' as in the preceding exemplary embodiment of FIG. 3.

Figure 5:
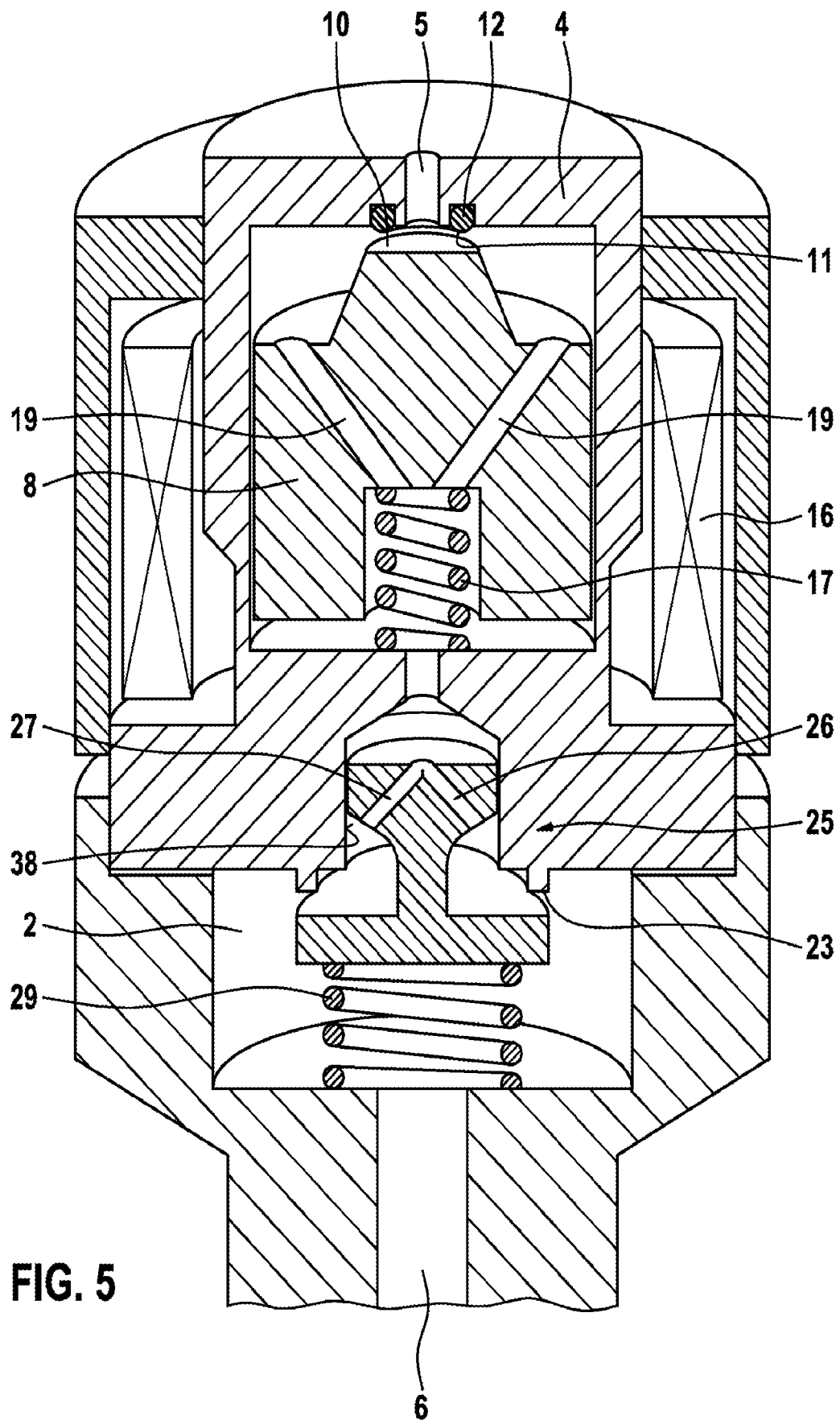
FIG. 5 shows another exemplary embodiment of a gas metering valve according to the present invention in a longitudinal section.

FIG. 5 shows another exemplary embodiment of the gas metering valve according to the present invention. Here, elastic sealing element 12 is implemented by a sealing ring at valve seat 11 against which valve element 8 rests with valve seal surface 10 in its closed position. For conducting gas through the valve element, two or more inwardly extending oblique boreholes 19' are formed, and return spring 17 is accommodated in a cylindrical recess in valve element 8. Closing element 26 of blocking valve 25 is guided in a guide borehole 38 in housing 1, the gas being conducted through oblique boreholes 27 in closing element 26. Seal surface 23 is formed at a circumferential annular ridge in gas chamber 2, with which closing element 26 cooperates.

Figure 6:
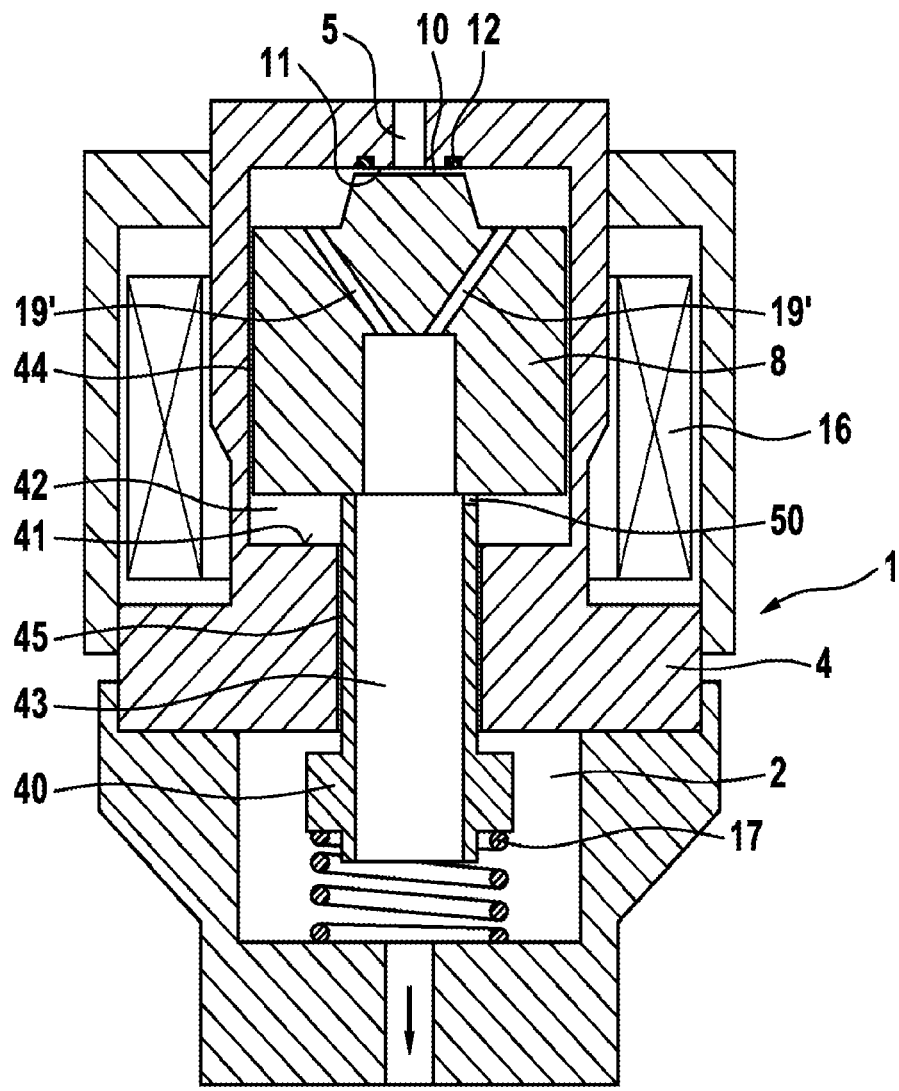
FIG. 6 shows another exemplary embodiment of a gas metering valve according to the present invention.

FIG. 6 shows another exemplary embodiment of a gas metering valve according to the present invention. Valve element 8 has a design similar to that of the exemplary embodiment shown in FIG. 5, however a coupler sleeve 40 is guided inside housing 1 in a longitudinally displaceable manner downstream from valve element 8. Return spring 17 is now situated between coupler sleeve 40 and housing 1 under compressive prestress and pushes coupler sleeve 40 against valve element 8, pushing the valve element in the direction of valve seat 11. In the interior, coupler sleeve 40 forms a channel 43, through which the gas flows in from valve seat 11 through oblique boreholes 19' and a central recess 39 when valve element 8 is open, and is conducted further to outlet opening 6 through this channel.

An attenuation space 42, which is delimited to the inside by coupler sleeve 40, is formed between valve element 8 and a shoulder 41 in housing 10. Attenuation space 42 is connected to gas chamber 2 via a first annular gap 44 between valve element 8 and housing 1 and a second annular gap between coupler sleeve 40 and the housing, both annular gaps 44, 45 being dimensioned in such a way that a gas flow out of or into attenuation space 42 may only take place in a restricted manner. Attenuation space 42 is used to attenuate the valve element movement in that, during the opening movement of valve element 8 away from valve seat 11, the gas is displaced from attenuation space 42 and pushed out via annular gaps 44, 45. Since the gas is only able to flow out in a restricted manner, overpressure builds in attenuation space 42, which attenuates the opening movement of valve element 8. During the closing movement, the volume of attenuation space 42 increases, and the pressure there decreases. This underpressure results in a slowing of the closing movement due to the counter pressure on the opposite side of valve element 8, so that valve element 8 is seated in an attenuated manner on valve seat 11, which results in reduced wear between valve seal surface 10 and valve element 11, and also in a lower noise emission.

For a more precise adjustment of the attenuation function, it may also be provided to provide a recess 50 between coupler sleeve 40 and valve element 8, for example in the form of one or multiple notch(es) at the end of coupler sleeve 40. As a result of the shape and number of recesses 50, the attenuation function may be precisely adjusted, without having to adapt annular gaps 44, 45. However, instead of a recess 50, or in addition thereto, a modification of annular gaps 44, 45 may be carried out, for example by longitudinal grooves in valve element 8 or at the outer side of coupler sleeve 40, to deliberately influence the flow resistance through annular gaps 44, 45, and thereby the attenuating action on valve element 8 by damping chamber 42.

Figure 7:
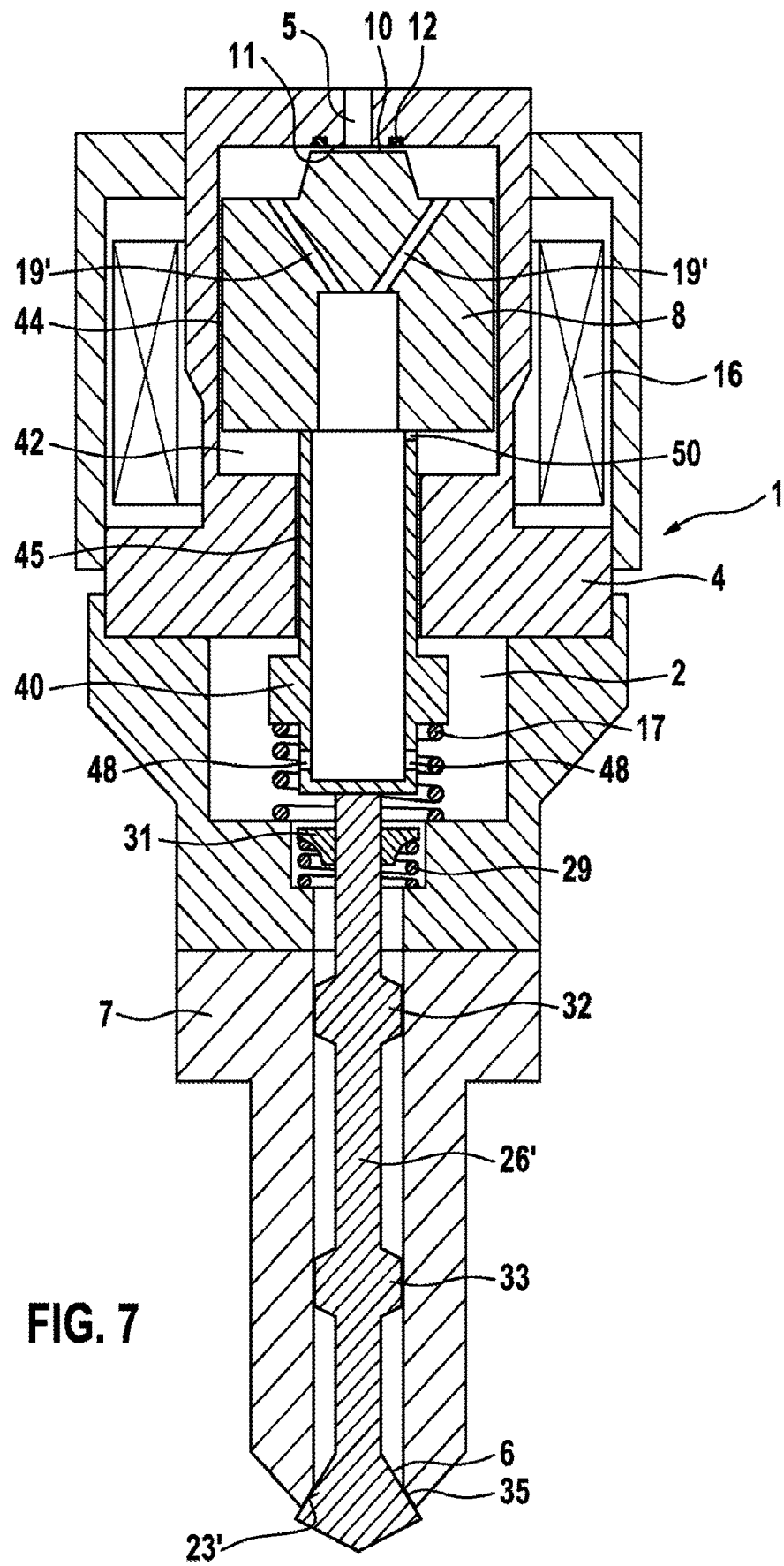
FIG. 7 shows a variant of the valve shown in FIG. 6, including a valve needle opening to the outside.

In another exemplary embodiment, FIG. 7 shows a further implementation of the gas metering valve shown in FIG. 6. Coupler sleeve 40 rests with its end face which faces away from valve element 8 against the needle-shaped closing element 26', so that coupler sleeve 42 is pushed in the direction of outlet opening 6, and the coupler sleeve, in turn, opens valve needle 26', as a result of the movement of valve element 8 in the opening direction of valve seat 11. The gas flow out of channel 43 to outlet opening 6 is ensured by multiple openings 48 in coupler sleeve 42. Valve needle 26' is also preloaded by a closing spring 29 against the conical valve seat 35 here, closing spring 29 being situated between a spring plate 31, which is connected to valve needle 26', and a projection in housing 1 under compressive prestress. Polished sections, which are not shown in the drawing and ensure an unrestricted gas flow to outlet opening 6, are also formed here at the two guide sections 31, 32.

Even though the gas metering valve is, in particular, suitable for the metered delivery of gas into a combustion chamber, it may also be used for other purposes, for example for the metered delivery of gas into the intake system of an internal combustion engine or also for other technical applications.

What is claimed is:

1. A gas metering valve for an internal combustion engine, comprising:
    a housing;
    a gas chamber situated in the housing and including an inlet opening and an outlet opening;
    a movable valve element situated in the gas chamber and movable by an electrical actuator against the force of a return spring, and which cooperates with a valve seat for opening and closing the inlet opening;
    a blocking valve situated between the valve element and the outlet opening, which is able to interrupt a gas flow in the gas chamber between the valve element and the outlet opening; and
    a coupler sleeve guided inside the housing in a longitudinally displaceable manner downstream from the valve element,
    wherein an attenuation space is delimited to an inside by the coupler sleeve and is formed between the valve element and a shoulder in the housing,
    wherein the attenuation space is connected to the gas chamber via a first annular gap between the valve element and the housing and a second annular gap between the coupler sleeve and the housing.

2. The gas metering valve as recited in claim 1, wherein the blocking valve includes a movable closing element which is loaded by a closing spring.

3. The gas metering valve as recited in claim 2, wherein the closing element has a plate-shaped design and is pushed by the closing spring against a seal surface formed in the gas chamber.

4. The gas metering valve as recited in claim 2, further comprising:
    a pressure pin formed at the valve element, which ends up resting against the closing element during an opening movement of the valve element and exerts an opening force on the closing element.

5. The gas metering valve as recited in claim 2, wherein the return spring is situated between the valve element and the closing element under compressive prestress.

6. The gas metering valve as recited in claim 1, wherein the blocking valve opens in a flow direction to the outlet opening and blocks an opposite flow direction.

7. The gas metering valve as recited in claim 1, wherein a valve seal surface is formed at the valve element, using which the valve element cooperates with a valve seat in the gas chamber for closing the inlet opening.

8. The gas metering valve as recited in claim 7, wherein an elastic sealing element is situated at the valve seal surface or at the valve seat.

9. The gas metering valve as recited in claim 8, wherein an annular ridge is formed at the valve seal surface, which, in a closed position of the valve element, ends up resting against the valve seat in such a way that first the elastic sealing element, and thereafter the annular ridge, ends up resting against the valve seat, during a closing movement of the valve element.

10. The gas metering valve as recited in claim 7, wherein a biting edge is formed at the valve seat.

11. The gas metering valve as recited in claim 1, wherein the blocking valve includes a closing element in the form of a valve needle, which is guided in the gas chamber in a longitudinally displaceable manner.

12. The gas metering valve as recited in claim 11, wherein the valve needle at an end facing the outlet opening includes a conical valve seat, using which the valve needle cooperates with a seal surface.

13. The gas metering valve as recited in claim 12, wherein a pressure pin is formed at the valve element, which ends up resting against the valve needle as a result of an opening movement of the valve element and exerts an opening force on the valve needle.

14. The gas metering valve as recited in claim 1, wherein the first annular gap and/or second annular gap function as a restriction gap.

* * * * *